SEQUENTIAL HEAD SWITCHING MAGNETIC RECORDING AND REPRODUCING SYSTEM FOR HIGH FREQUENCY SIGNALS

Filed April 17, 1964 2 Sheets-Sheet 1

INVENTOR
ALVIN MAYNARD SLATON
BY Burgess Dinklage & Sprung
ATTORNEYS

INVENTOR
ALVIN MAYNARD SLATON
BY Burgess Dinklage & Sprung
ATTORNEYS

United States Patent Office 3,403,231

Patented Sept. 24, 1968

3,403,231

SEQUENTIAL HEAD SWITCHING MAGNETIC RECORDING AND REPRODUCING SYSTEM FOR HIGH FREQUENCY SIGNALS

Alvin Maynard Slaton, 279 Nishi-ku, Kunitachi, Machi, Tokyo, Japan

Filed Apr. 17, 1964, Ser. No. 360,677
Claims priority, application Japan, Apr. 20, 1963, 38/20,546
6 Claims. (Cl. 179—100.2)

ABSTRACT OF THE DISCLOSURE

The following disclosure describes a magnetic recording and reproducing system wherein a control signal is generated, split into 180° components, and used to control the switching of a pair of electronic switches. The switches have additional inputs connected to the source of signals to be recorded. The output of one of the switches is inverted. The inverted output and the output from the other switch are combined to form a composite signal suitable for recording on a magnetic record medium.

This magnetic recording and reproducing system relates to magnetic recording and reproducing systems, and more particularly to such systems for recording and reproducing on magnetic sensitive media signal information having a frequency ranging over a wide spectrum, including video frequencies.

Various problems are involved when recording and reproducing on magnetically sensitive recording media, signals having frequencies ranging over a wide spectrum, as for example frequencies extending over a 20 kilocycle range. Assuming the use of reasonable speeds of the recording medium, conventional equipment is restricted with respect to its usable frequency range. The recordable range can be increased by increasing the speed of the medium, but the speeds required for the recording of higher frequencies are such that the system becomes impractical because of the large amount of medium employed for a given recording period. It is possible to reduce the linear speed of the medium by recording successive tracks extending laterally across the medium. The conventional magnetic recording and reproducing systems with this mode of operation involves the use of magnetic transducer heads which are mounted to successively sweep across the coated surface of the magnetically sensitive medium while the medium is being advanced in the direction of its length. While this arrangement makes it theoretically possible to provide relative speeds such that frequencies up to four megacycles or higher can be recorded, its application involves a number of problems. For example such system requires complex synchronizing or timing devices, and the whole system necessarily involves relatively heavy and expensive equipment, which is not readily adapted for home use.

It is accordingly among the primary objects of the present invention to provide a novel system for recording and reproducing on a magnetic recording medium moving at relatively low speed, signal information having a frequency ranging over a wide spectrum, including video frequencies, in simple and practical manner.

It is a specific object of the invention to provide a novel system for recording and reproducing on a magnetic tape video information normally created for and utilized by standard television receivers using a standard low speed recording mechanism of the type now available and utilized for audio recording and reproduction, such as a home tape recorder.

According to the invention, the signal information having frequencies ranging over a wide spectrum is split or modulated by pulses having suitable duration and repetition rate. The individual portions of the pulse interrupted or modulated signal are recorded so that the recording and reproduction can be accomplished without benefit of complex synchronizing or timing device. This concept is based upon and clearly represented by the following mathematical relationship, $$P_{rf}=\frac{S}{G_{eff}+D_p}-1 \qquad \text{(a)}$$

where $P_{rf}$=pulse repetition rate
$S$=length of sensitive medium displaced/second
$G_{eff}$=effective gap of recording head=

$$+\frac{G_{actual}}{\pi}$$

$D_p$=distance sensitive medium travels during pulse duration with all length dimensions being given in the same units, i.e. when S is measured in inches/sec., $G_{eff}$ and $D_p$ are measured in inches It is known that magnetic lines of force bend outward and follow a semi elliptic path when caused to traverse an air gap. For practical application only a small portion of the apex of this magnetic elliptic can influence the sensitive medium and this portion defines the effective recording head gap width. Assuming the effective gap width to be $5\times10^{-4}$ inches, it follows that a section of recording medium of length S can accomodate $$\frac{S}{5\times10^{-4}}-1$$

sections of information. In practice it has been found that practical gap widths are much less than that width quoted in the above example.

A further relationship is utilized in this system. The complex signal information created for and utilized by a television receiver is of precise size, shape, duration and relation. In this invention, the use of a precisely synchronized mechanism is avoided by assuming that the averaged variation of any sporadic phenomena is equal to zero, and therefore, for practical purposes a sample of the video signal may be taken at a rate that obtains information from each portion of the signal many times each second. For standard television signals a possible sampling rate is obtained by the following formula;

$$P_{rf}=\left[x\cdot15{,}750+\left(\frac{15{,}750}{y}\right)\right](2\cdot T_T) \qquad \text{(b)}$$

where $x$=an odd number
$y$=an even number
$T_T$=total number of tracks to be recorded One additional physical relationship is hereby established to utilize another phenomena essential to the operation of this particular application as follows: The information to be recorded is married in such a manner that one sample forms the positive portion and a second sample forms the negative portion of a composite electrical waveform.

For a better understanding of the invention and to show how it may be carried into effect, reference will now be made to the accompanying drawings in which:

FIG. 1 shows the video recording circuit according to the present invention. In the drawing, 1 designates a stabilized oscillator for generating a single phase wave-form having recurring frequency determined by the formula $$f_R=\frac{P_{rf}}{T_T\cdot 2} \qquad (c)$$

Figure 1:
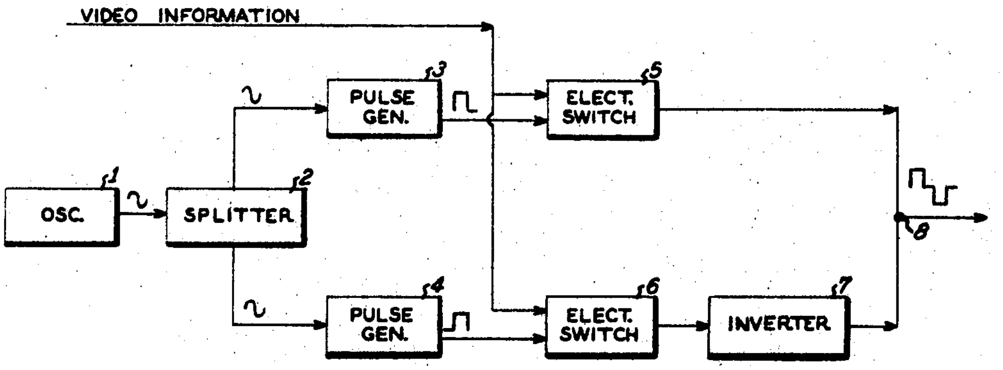
FIG. 1 is a block diagram showing the recording circuits.

This wave is applied to a splitter 2 which splits the single wave into two electrically symmetrical components, one having a phase angle of 0° and the other 180°. The one component is utilized to trigger a pulse generator 3 and the other component is similarly utilized to trigger another pulse generator 4. These pulse generators create electrical impulses of very short time duration, of approximately constant amplitude and repetition rate. Thus the electrical impulses of repetition rate $$P_{rf}=\left[x\cdot 15{,}750+\frac{15{,}750}{y}\right]\cdot 2T_T$$

is obtained. These impulses are applied to companion electronic switches 5 and 6, respectively.

The video information to be recorded is also applied to these electronic switches 5, 6, each of which passes a portion of said video information during that period of time the switching impulse is existent. Thus the video information, effectively, is disected by the impulses to form a series of modulated energy impulses. The series obtained from the switches 5, 6 are then married at 8 in proper time and phase relationship to create the train of impulses modulated according to the video information. In this connection it is desirable that alternate energy impulses be systematically reversed in polarity by means of an inverter 7 to prevent formation of a magnetized condition in the recording head. The composite waveform is amplified and applied to a recording mechanism, and thus the video information is recorded on a magnetically sensitive medium traveling at a relatively slow speed. For this recording it, is important to use an amplifier that is capable of handling and amplifying very short energy pulses without serious deterioration.

Figure 2:
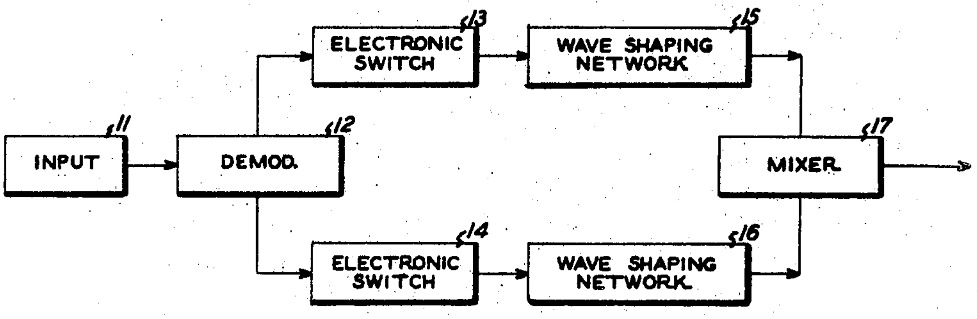
FIG. 2 is a block diagram showing the play-back circuits.

FIG. 2 shows a possible form of a reproducing circuit. The reproduction is accomplished by the expedient of amplification, full wave rectification, waveform shaping and finally mixing the individual signals in the same polarity as the original samples.

In FIG. 2 the signal resulting from the reproducer is amplified by a suitable amplifier (not shown). The signal thus amplified is applied through an input terminal 11 to a demodulator 12, which is connected to a pair of electronic switches 13, 14 which form a full wave rectifier. Individual impulses are shaped and shortened by wave shaping networks 15, 16 and then mixed at a mixer 17 so that essentially the resultant waveform is a reproduction of the original sample.

Figure 3:
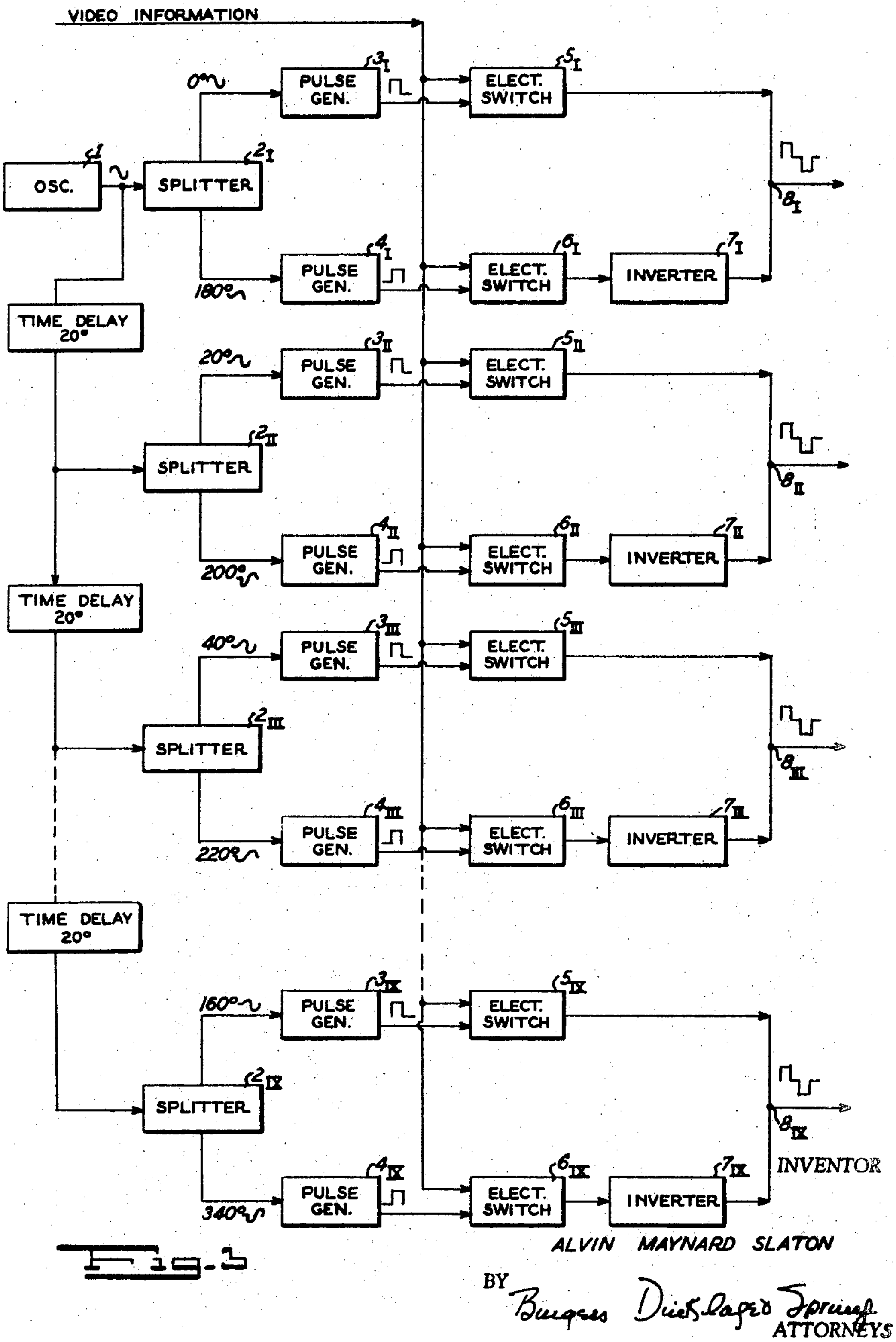
FIG. 3 is a block diagram showing a modified form of the recording circuit according to the invention.

The system above explained with reference to FIGS. 1 and 2 can record and reproduce samples of signal information that varies over a wide frequency spectrum on a magnetically sensitive medium moving at relatively low speed. The system has been successfully employed to record approximately 340,000 samples per second on one recording track at a displacement velocity of 12.5 inches per second. In this system, the definition can be improved by using a plurality of recording tracks. An example of such recording circuit is illustrated in FIG. 3.

The objective of this mechanism is to provide a train of electrical impulses each of which is generated in a sequential, predetermined manner but each having one to the other a constant relation in time. The combination of impulses per second that may be generated is governed by the requirement that the selected time phasing (phase angle) of each recording channel is derived by the following formula (d):

$$A_d=\frac{360}{2T_T} \qquad (d)$$

where $A_d$=phase angle $T_T$=total number of recording tracks

The circuit shown in FIG. 3 comprises nine recording channels I to IX, each of which has essentially identical construction with that of the circuit as explained with reference to FIG. 1. In FIG. 3, the parts similar to those shown in FIG. 1 are designated by the same reference numerals as used in FIG. 1 each of which is affixed with I, II, . . . or IX to show the corresponding channel. The function of each of the nine channels is similar to that of FIG. 1 and therefore the detailed description thereof will not be necessary. For purpose of this illustration it is to be noted in FIG. 3 that the single phase wave generated by a stabilized oscillator 1 is applied to channel I directly, to channel II with 20° of phase angle, to channel III with 40° of phase angle, and so on and finally it is applied to channel IX with 160° of phase angle.

Figure 4:
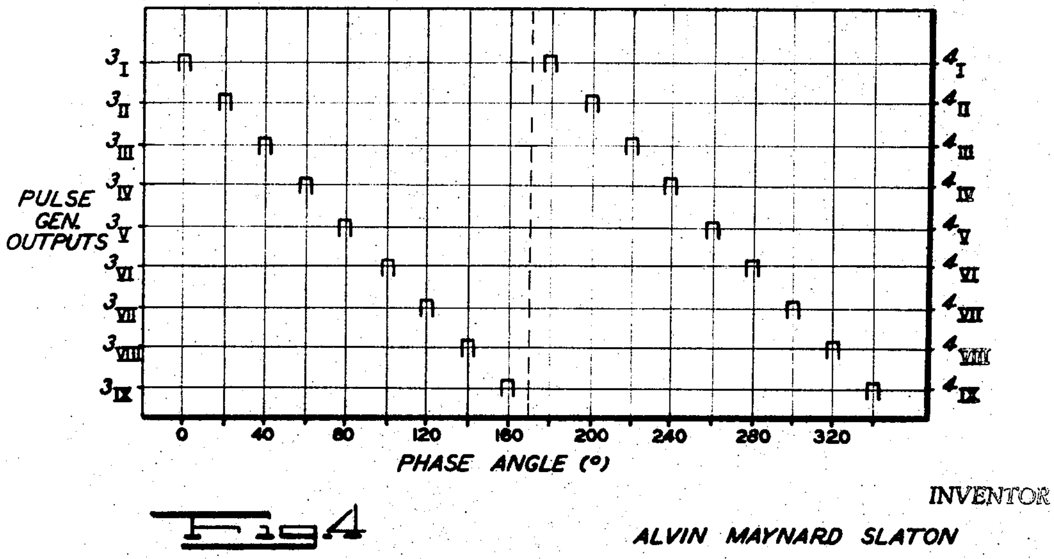
FIG. 4 is a graph of the time sequence of pulses generated in the recording circuit shown in FIG. 3.

Time sequence of pulse generation for a 9 channel system is shown in FIG. 4. Each cycle of waveform created by stabilized oscillator provides 18 pulses each separated by 20 electrical degrees of angular displacement. The system recording rate therefore equals $(f_R\cdot T_T)\cdot 2$.

Assuming:

$f_R=1.5\times 10^5$ c./s.

$T_T=9$ $R_R=1.5\times 10^5\times 9\times 2$ c./s.

$=2.7\times 10^6$ c.p.s.

$=2.7$ mc./s.

Thus the video information is recorded through these nine channels I to IX on nine tracks on a magnetically sensitive medium, at the rate of:

$$(f_R\cdot T_T)\cdot 2 \text{ pulses per second} \qquad (e)$$

where:

$f_R$=frequency determined by formula (c)

$T_T$=total number of tracks

Although the system illustrated in FIG. 3 comprises nine recording channels, the number of channels can be determined as desired according to recording requirements. In recording video information by home recording equipment, only two channels will give acceptable results.

In the above description, the video recording and reproducing system has been explained with reference to the accompanying drawing, but it will be understood that the invention is not to be restricted to such embodiment. The invention generally includes recording and reproducing of signal information over a wide frequency spectrum, including video frequencies, on a magnetically sensitive medium.

I claim:

1. Apparatus for recording a signal on a magnetic record medium comprising:

control signal generating means for generating a control signal;

signal splitting means connected to said control signal generating means for separating said control signal into two electrical components, said two electrical components being 180° out of phase with each other;

first pulse generating means connected to said signal splitting means for sensing one of said two electrical components and for generating a pulse in response thereto;

second pulse generating means connected to the output of said signal splitting means for sensing the other of said two electrical components and for generating a pulse in response thereto;

first switch means connected to the output of said first pulse generating means and to the source of signals to be recorded for generating an output signal when said first switch means simultaneously receives signals from said first pulse generating means and said source of signals to be recorded;

second switch means connected to the ouptut of said second pulse generating means and to said source of signals to be recorded for generating an output signal when said second switch means simultaneously receives signals from said second pulse generating means and said source of signals to be recorded;

inverting means connected to the output of said second switch means for inverting the output of said second switch means; and signal summation means connected to the output of said first switch means and to the output of said inverting means for summing the output of said first switch means and the output of said inverting means, said signal summation means adapted for connection to the recording head of a magnetic recorder so that said summed signal can be recorded on a magnetic recording medium.

2. Apparatus as claimed in claim 1 including:

a plurality of time delay means connected in series to the output of said control signal generating means for delaying the signals from said control signal generating means;

a plurality of signal splitting means equal in number to said plurality of time delay means for splitting said control signal into two electrical components, said components being 180° out of phase with each other;

the input of one of said signal splitting means connected between each higher order and the next lower order of said plurality of time delay means and the input of one of said signal splitting means connected to the output of the last time delay means of said plurality of time delay means;

a plurality of pairs of pulse generating means equal in number to said plurality of signal splitting means for generating pulses upon the receipt of an input signal;

one of each pair of said pulse generating means connected to one of said signal splitting means to sense one of said two electrical components, the other of each pair of said pulse generating means connected to the same signal splitting means to sense the other of said two electrical components;

a plurality of pairs of two input electrical switching means equal in number to said plurality of pairs of pulse generating means for generating output signals upon the simultaneous receipt of two input signals;

one input of all of said electrical switching means connected to said source of signals to be recorded, the other input of one of each pair of electrical switching means connected to the output of said one of each pair of pulse generating means, and the other input of the other of each pair of electrical switching means connected to the output of said other of each pair of pulse generating means;

a plurality of inverting means equal in number to the plurality of pairs of two input electrical switching means for inverting electrical signals, one of said plurality of inverting means connected to the output of said other switching means of each of said pair of switching means; and a plurality of signal summation means equal in number to the plurality of inverting means for summing electronic signals, each of said signal summation means having one input connected to an output of said one switching means of each pair of switching means and a second input connected to the output of the inverting means connected to the other switching means of said same pair of switching means, said signal summation means adapted for connection to the recording head of a magnetic recorder so that said summed signals can be recorded on a magnetic recording medium.

3. Apparatus as claimed in claim 2 wherein said plurality of time delay means, said plurality of signal splitting means, said plurality of pairs of pulse generating means, said plurality of pairs of electrical switching means, said plurality of inverting means, and said plurality of signal summation means all equal eight in number.

4. Apparatus for recording a signal on and reproducing a signal from a magnetic record medium comprising:

control signal generating means for generating a control signal;

signal splitting means connected to said control signal generating means for separating said control signal into two electrical components, said two electrical components, being 180° out of phase with each other;

first pulse generating means connected to said signal splitting means for sensing one of said two electrical components and for generating a pulse in response thereto;

second pulse generating means connected to the output of said signal splitting means for sensing the other of said two electrical components and for generating a pulse in response thereto;

first switch means connected to the output of said first pulse generating means and to the source of signals to be recorded for generating an output signal when said first switch means simultaneously receives signals from said first pulse generating means and said source of signals to be recorded;

second switch means connected to the output of said second pulse generating means and to said source of signals to be recorded for generating an output signal when said second switch means simultaneously receives signals from said second pulse generating means and said source of signals to be recorded;

inverting means connected to the output of said second switch means for inverting the output of said second switch means;

signal summation means connected to the output of said first switch means and to the output of said inverting means for summing the output of said first switch means and the output of said inverting means, said signal summation means adapted for connection to the recording head of a magnetic recorder so that said summed signal can be recorded on a magnetic recording medium;

demodulation means for demodulating said recorded signal adapted for connection to the reproduction head of a magnetic recorder so that said summed recorded signal can be reproduced;

third switch means connected to the output of said demodulation means for sensing a first component of said recorded signal;

fourth switch means connected to the output of said demodulation means for sensing a second component of said recorded signal; and mixing means connected to the outputs of said third and fourth switch means for mixing the outputs of said third and fourth switch means.

5. Apparatus as claimed in claim 4 including:

a first wave shaping network connected between said third switch means and said mixing means; and a second wave shaping network connected between said fourth switch means and said mixing means.

6. Apparatus as claimed in claim 5 including:

a plurality of time delay means connected in series to the output of said control signal generating means for delaying the signals from said control signal generating means;

a plurality of signal splitting means equal in number to said plurality of time delay means for splitting said control signal into two electrical components, said components being 180° out of phase with each other;

the input of one of said signal splitting means being connected between each higher order and the next lower order of said plurality of time delay means and the input of one of said signal splitting means being connected to the output of the last time delay means of said plurality of time delay means;

a plurality of pairs of pulse generating means equal in number to said plurality of signal splitting means for generating pulses upon the receipt of an input signal;

one of each pair of said pulse generating means connected to one of said signal splitting means to sense one of said two electrical components, the other of each pair of said pulse generating means connected to the same signal splitting means to sense the other of said two electrical components;

a plurality of pairs of two input electrical switching means equal in number to said plurality of pairs of pulse generating means for generating output signals upon the simultaneous receipt of two input signals;

one input of all of said electrical switching means connected to said source of signals to be recorded, the other input of one of each pair of electrical switching means connected to the output of said one of each pair of pulse generating means, and the other input of the other of each pair of electrical switching means connected to the output of said other of each pair of pulse generating means;

a plurality of inverting means equal in number to the plurality of pairs of two input electrical switching means for inverting electrical signals, one of said plurality of inverting means connected to the output of said other switching means of each of said pair of switching means;

a plurality of signal summation means equal in number to the plurality of inverting means for summing electronic signals, each of said signal summation means having one input connected to an output of said one switching means of each pair of switching means and a second input connected to the output of the inverting means connected to the other switching means of said same pair of switching means, said signal summation means adapted for connection to the recording head of a magnetic recorder so that said summed signals can be recorded on a magnetic recording medium;

a plurality of demodulation means equal in number to the plurality of signal summation means adapted for connection to the reproduction head of a magnetic recorder so that said summed recorded signals can be reproduced;

a second plurality of pairs of switch means equal in number to said plurality of demodulation means for generating output signals upon the receipt of an input signal, the input of one of each of said second plurality of pairs of switch means connected to one output of said demodulation means, and the input of the other of each of said second plurality of pairs of switch means connected to a second output of the same demodulation means; and a plurality of mixing means equal in number to said plurality of second pairs of switch means for mixing electronic signals, the inputs of each of said plurality of mixing means connected to the outputs of one and the other of a pair of said second plurality of pairs of switch means.

References Cited

UNITED STATES PATENTS

| | | | |
|---|---|---|---|
| 2,867,685 | 1/1959 | Johnson | 178—6.6 |
| 2,881,255 | 4/1959 | Hall | 178—6.6 |
| 2,957,953 | 10/1960 | Woodward | 179—100.2 |

BERNARD KONICK, *Primary Examiner.*

J. R. GOUDEAU, *Assistant Examiner.*